UNITED STATES PATENT OFFICE.

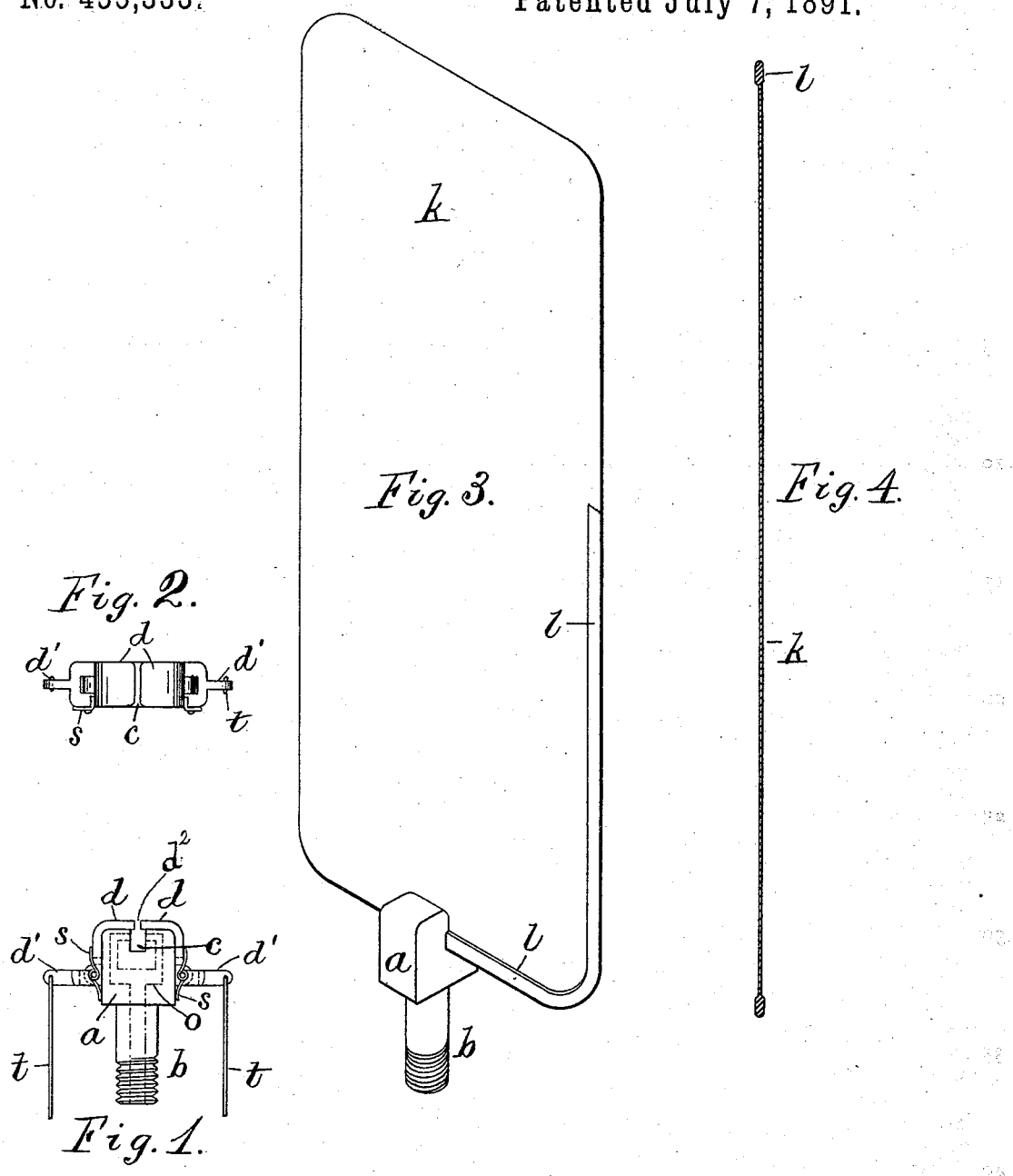

JOHN W. HYATT, OF NEWARK, NEW JERSEY, ASSIGNOR TO THE CELLULOID COMPANY, OF SAME PLACE.

APPARATUS FOR THICKENING AND PROTECTING THE EDGES OF COLLARS OR CUFFS.

SPECIFICATION forming part of Letters Patent No. 455,333, dated July 7, 1891.

Application filed July 1, 1890. Serial No. 357,448. (No model.)

*To all whom it may concern:*

Be it known that I, JOHN W. HYATT, a citizen of the United States, residing at Newark, Essex county, New Jersey, have invented certain new and useful Improvements in Apparatus for Thickening and Protecting the Edges of Collars or Cuffs, fully described and represented in the following specification and the accompanying drawings, forming a part of the same.

This invention consists in an improved means of applying a semi-fluid composition to the edge of a collar, cuff, or analogous article to produce a raised strip or border of uniform thickness along the edge of the article in imitation of a folded hem.

The invention is especially applicable to water-proof collars and cuffs, and a suitable composition for such use is formed of dissolved pyroxylene; but any other composition of suitable character may be used.

By the use of my invention the article may be made in a layer of even thickness of any suitable material, and the edge afterward thickened in imitation of a hem.

The apparatus consists in a tool provided with a gage-channel supplied with the composition, and through which channel the edge of the article may be drawn.

The invention will be understood by reference to the drawings, in which—

Figure 1 shows the tool in elevation. Fig. 2 shows the same in plan. Fig. 3 shows the same in perspective with the edge of a cuff inserted therein, and Fig. 4 is a longitudinal section of the cuff with the thickened border.

The tool in Fig. 1 is shown with a head $a$, having a shank $b$ perforated for the passage of the composition, and threaded to connect it with a suitable supply-tank. In practice the connection with such tank would be provided with a valve that could be opened by the foot of the operator when the tool was in use and automatically closed when the article was withdrawn from the coating-channel.

A gage-channel $c$, of suitable width and depth for the introduction of the edge of the cuff to form a layer of the desired width and thickness, is shown formed in the head $a$ near its upper surface, and jaws $d$ are pivoted upon the head, with their ends in proximity over the channel to guide the article to the center of the same. The jaws are pressed toward the head by springs $s$, and are provided each with arms $d'$ for simultaneously separating the jaws to remove the article when the composition has been applied to its entire edge. Cords $t$ are shown attached to the jaws, which may be connected with the same treadle to open the jaws simultaneously.

The semi-fluid composition when supplied to the shank is conducted through a passage in the same to the gage-channel $c$, where it is discharged upon the edge of the cuff. A branch of the passage is preferably extended to each side of the channel when it is desired to apply the composition upon the article at both sides of the edge. The passage or passages lettered $o$ in Fig. 1 are in practice formed by drilling holes through the head in suitable directions and plugging up the outer ends of the holes.

In using such a tool the operator, as shown in Fig. 3, drops the edge of the cuff $k$ through the slit $d^2$ into the gage-channel $c$. He then permits the semi-fluid composition to flow through the holes $o$ into the channel upon the opposite sides of the cuff at the border. He then draws the border of the cuff through the channel, the composition adhering to the same in a layer shown at $l$ in Fig. 3, whose width and thickness are governed by the walls of the channel. The composition by its semi-fluid character fills the sides and bottom of the gage-channel, and thus forms a bath to coat the edge as well as the border of the article. When the border of the cuff or other article is wholly coated, the operator checks the supply of composition to the channel and withdraws the article therefrom, first separating the jaws $d$ by traction upon the cords $t$. The article is then laid to dry upon a suitable support, avoiding any contact with the soft composition.

The injection of the composition into a confined channel of suitable dimensions controls the application of the composition to the cuff most perfectly, as the desired amount only of the composition may thus be applied, and the layer which forms the thickened border of the article may be made uniform in its width and thickness.

The raised border may be formed upon one side only of the article, if desired, by a proper construction of the channel or other means used for regulating the application of the composition.

Having thus set forth the nature of my invention, what I claim is—

1. The apparatus for applying a pasty composition in a layer of uniform width and thickness along the edge of a collar or cuff, consisting in a head provided with a gage-channel of suitable width and depth and with a passage for supplying the semi-fluid composition to the edge of the article, as and for the purpose set forth.

2. The apparatus for applying a pasty composition in a layer of uniform width and thickness along the edge of a collar or cuff, consisting in a head provided with a gage-channel of suitable width and depth and with a passage for supplying the semi-fluid composition to the edge of the article and having removable jaws arranged adjacent to the gage-channel to guide the edge of the collar or cuff therein and to permit the removal of the edge therefrom, substantially as herein set forth.

In testimony whereof I have hereunto set my hand in the presence of two subscribing witnesses.

JOHN W. HYATT.

Witnesses:
C. S. LOCKWOOD,
THOS. S. CRANE.